United States Patent [19]

Maddock

[11] 4,409,755

[45] Oct. 18, 1983

[54] HAND HELD LIQUID HERBICIDE APPLICATOR

[76] Inventor: Mitchell E. Maddock, Rte. 1, Box 24AA, Florence, Ariz. 85232

[21] Appl. No.: 264,636

[22] Filed: May 18, 1981

Related U.S. Application Data

[63] Continuation-in-part of Ser. No. 240,779, Mar. 5, 1981, Pat. No. 4,357,779, which is a continuation-in-part of Ser. No. 94,715, Nov. 16, 1979, Pat. No. 4,291,491, which is a continuation-in-part of Ser. No. 72,147, Sep. 4, 1979, Pat. No. 4,305,224.

[51] Int. Cl.³ .............................................. A01M 21/00
[52] U.S. Cl. ................................................... 47/1.5
[58] Field of Search .................. 47/1.5; 401/196, 197, 401/199, 202, 205, 207, 198

[56] References Cited

U.S. PATENT DOCUMENTS

| 1,939,612 | 12/1933 | Rose | 401/207 |
|---|---|---|---|
| 2,326,669 | 8/1943 | Nimrick | 401/206 |
| 2,659,918 | 11/1953 | Stoner | 47/1.5 |
| 2,979,757 | 4/1961 | Smith | 47/1.5 |
| 3,048,537 | 8/1962 | Pall et al. | 401/198 |
| 3,167,085 | 1/1965 | Redmer | 251/8 X |
| 3,232,006 | 2/1966 | Atherton et al. | 47/1.5 |
| 3,826,581 | 7/1974 | Henderson | 401/204 X |
| 4,027,986 | 6/1977 | Patrick | 401/205 X |
| 4,309,842 | 1/1982 | Jones | 47/1.5 |
| 4,336,767 | 6/1982 | Wada | 401/196 X |

FOREIGN PATENT DOCUMENTS

| 1164203 | 10/1958 | France | 47/1.5 |
|---|---|---|---|
| 530187 | 7/1955 | Italy | 251/8 |
| 96304 | 5/1960 | Norway | 401/205 |
| 22294 | of 1898 | United Kingdom | 401/205 |
| 1085635 | 10/1967 | United Kingdom | 47/1.5 |

*Primary Examiner*—James R. Feyrer
*Attorney, Agent, or Firm*—Herbert E. Haynes, Jr.

[57] ABSTRACT

A hand-held liquid herbicide applicator for wipingly applying the liquid herbicide on undesired vegetation. The applicator includes an elongated tubular handle for containing a supply of the liquid herbicide with a valve at the lower end of the handle to control the flow of herbicide from the handle to an applicator head carried on the bottom of the handle. The applicator head includes a demountable sponge of special configuration in that it has a porous relatively dense skin which causes even and complete saturation of the entire sponge to prevent uncontrollable liquid flow in one or more localized parts of the sponge.

10 Claims, 5 Drawing Figures

HAND HELD LIQUID HERBICIDE APPLICATOR

CROSS-REFERENCE TO RELATED APPLICATIONS

This application is a continuation-in-part of copending U.S. patent application Ser. No. 240,779, filed Mar. 5, 1981, for: HAND HELD LIQUID HERBICIDE APPLICATOR, that issued on Nov. 9, 1982, as U.S. Pat. No. 4,357,779, and which is in turn a continuation-in-part of copending U.S. patent application Ser. No. 094,715, filed Nov. 16, 1979, for: LIQUID APPLICATOR, that issued on Sept. 29, 1981, as U.S. Pat. No. 4,291,491, and which is in turn a continuation-in-part of copending U.S. patent application Ser. No. 072,147, filed Sept. 4,1979, for: APPARATUS FOR SELECTIVE APPLICATION OF HERBICIDE, which issued on Dec. 15, 1981, as U.S. Pat. No. 4,305,224, all by the same inventor.

BACKGROUND OF THE INVENTION

1. Field of the Invention

This invention relates to mechanisms of the application of liquid and more particularly to a hand held mechanism for selective application of liquid herbicides.

2. Description of the Prior Art

A comparatively new type of liquid herbicide has been developed which is sometimes referred to as a systemic herbicide. A systemic herbicide is one which will be absorbed by the vegetable to which it is applied and will permeate the vegetation to kill the root systems without affecting adjacent vegetation or the soil in any way. Systemic herbicides and other types of herbicides may be applied by a conventional spray method when complete destruction of all plant life in a sprayed area is desired. However, selective herbicidal tasks such as weeding operations, require that herbicides be selectively applied only to the vegetation which is to be destroyed, and this, of course, eliminates the usage of spray application techniques.

A special herbicide applicator which is designed primarily for use with systemic herbicides has been developed for use in cultivated fields and this device is in the form of a trailing wick that is attached to a tractor, or other farming mechanism. The trailing wick applicator is carried by the farm machine so as to follow the furrows between the crop plants. In this manner, the trailing wick applicator will wipe the herbicide on the weeds that are growing in the furrows only in that the trailing wick can not be allowed to come into close proximity with the plant crops. Thus, such a device is limited in its use, in that it can not be employed to kill vegetation that is proximate any plants that are not to be killed, due to the fact that the trailing wick applicator can not be controlled with any degree of accuracy.

Many hand-held liquid applicators have been devised for applying various types of liquids to various items. For example, British Pat. No. 22,294, of John H. Dawson, accepted Oct. 24, 1898, discloses an elongated tubular handle having a liquid reservoir on one end and an irregularly shaped substantially spherical sponge on its other end and disposed so as to surround liquid discharge apertures formed in that end of the tube. This device was designed for applying water to a blackboard for cleaning thereof, and is not suitable for selective application of herbicides for several reasons. First, the tubular handle of this patented device is relatively short and straight and is thus not particularly well suited for wipingly applying herbicide on low growing weeds as the user walks about an area to be treated. However, the most serious problem with this particular prior art device, and all others known to me, is leakage, or uncontrollable liquid dripping. Liquid flowing out of the delivery apertures will quickly saturate the areas of the sponge, or other wicking materials, immediately adjacent thereto and some liquid channelization occurs, which results in an area or areas of excessive liquid flow usually resulting in dripping. When the prior art applicators are being employed to wipingly apply water, as is the case in the above described Dawson patent, or other such liquids, uncontrollable liquid flow does not present any serious problems. However, this cannot be tolerated when a systemic herbicide is being used, in that damage or complete loss of desirable vegetation can result.

A particular hand-held prior art herbicide applicator has been developed for selective application purposes, and that applicator is fully disclosed in U.S. Pat. No. 4,027,986. Briefly, this particular prior art applicator comprises a reservoir handle with a fill and vent control plug on its upper end and an applicator head on its other end. The applicator head is a bell-shaped enlargement, which is filled with a foam rubber material and has its lower end wrapped in a carpeting material. The herbicide flows from the reservoir handle through an orifice and saturates the foam rubber and the carpeting material. Although this dispenser can be used for selectively applying herbicide on vegetation, its usage is limited to a more or less dabbing type of application due to the particular head configuration. The applicator head is designed primarily for dabbingly applying the herbicide on newly cut tree trunks to kill the root systems thereof and can not practically and efficiently be used to wipingly apply herbicide to, for example, weeds which have outgrown slower growing grasses and the like, and it is awkward to use inbetween closely spaced crop plants.

Therefore, a need exists for a new and improved hand held liquid herbicide applicator which overcomes some of the shortcomings and drawbacks of the prior art.

SUMMARY OF THE INVENTION

In accordance with the present invention, a new and improved hand-held apparatus for selective application of herbicide, and particularly a systemic herbicide, is disclosed. The apparatus comprises, an elongated tubular handle which serves as a reservoir for the liquid herbicide. One end of the tubular handle, i.e., the upper end, due to the disposition thereof when the present apparatus is being used, is open to serve as a fill port and is closable by means of a demountable hand grip when the apparatus is in use. The other, or lower end of the tubular reservoir handle has, in the preferred embodiment, an in-line transparent sight tube affixed thereon, and an in-line manually adjustable valve means is mounted on the lowermost end of the sight tube for adjustably controlling the herbicide flow rate and/or shutting off the flow completely. An especially configured applicator head is connected to the outlet of the valve means for receiving the liquid herbicide and by which the herbicide is wipingly applied to vegetation that is to be destroyed.

The special applicator head is a substantially elongated structure which extends in an angular relationship with respect to the longitudinal axis of the tubular reservoir handle so that when the handle is held in a normal and comfortable position by a user, it will extend angularly downwardly and forwardly of the user, and the applicator head will lie in a substantially horizontal plane.

The applicator head includes an elongated tubular dispenser conduit which is bent adjacent one end thereof for attachment to the outlet port of the valve means which allows the bore of the dispenser conduit to be placed in communication with the bore of the reservoir handle when the valve is open, so as to receive the liquid herbicide therefrom. The other, or free end of the tubular dispenser conduit is closed and a plurality of longitudinally aligned incrementally spaced apertures are formed in the dispenser conduit so as to extend along the bottom surface thereof. An elongated special synthetic sponge assembly is demountably carried on the dispenser conduit to absorbingly receive the liquid herbicide therefrom, and by which the herbicide is wipingly applied on the undesired vegetation. The demountable sponge assembly consits of an elongated resilient sleeve having plural apertures formed therealong in longitudinally aligned spaced increments which match those formed in the dispenser conduit. The sleeve has a bore the inside diameter of which is substantially equal to the outside diameter of the dispenser conduit so that the sleeve may be coaxially slidably mounted on, and removed from, the dispenser conduit. An elongated synthetic sponge, preferably of substantially semi-circular cross section is affixed to the sleeve so as to extend along the length thereof and wrap around the bottom of the sleeve. In this manner, the liquid herbicide received in the dispenser conduit will emerge therefrom through its apertures and will pass through the aligned apertures of the sleeve and will be absorbed by the sponge.

Uncontrolled liquid flow, or dripping, resulting from liquid channelization or other localized over saturation of the sponge proximate the apertures is prevented by a relatively dense porous peripheral skin formed, or otherwise provided, on the peripheral surface of the sponge. The porous relatively dense skin retards surface wetting of the sponge to the extent that complete internal saturation of the sponge takes place prior to wetting of the surface skin. Once completed internal saturation of the sponge is completed, channelization and/or other localized over saturation does not occur due to the absorption qualities of the sponge, and a uniformly wetted dripless applicator head results.

The demountable sponge assembly, that is the special sponge fixedly carried on the resilient sleeve, provides means by which a worn, or otherwise damaged, sponge may be easily replaced, thus prolonging the useful life of the herbicide applicator apparatus.

In use, the hand-held liquid herbicide applicator is simply swung in a back and forth motion so that the applicator head moves in a substantially horizontal plane as the user walks about the area to be treated. Such use will bring the elongated uniformally wetted sponge into contact with, for example, weeds which have outgrown slower growing grasses or other vegetation that the user desires to keep, and the liquid herbicide will be wipingly applied only on the weeds.

Accordingly, one object of the present invention is to provide a new and improved apparatus for selectively applying liquid herbicide on undesired vegetation.

Another object of the present invention is to provide a new and improved apparatus for selective application of a systemic herbicide on undesired vegetation.

Another object of the present invention is to provide a new and improved apparatus for selective herbicide application on undesired vegetation, with the apparatus including an elongated tubular handle for supplying the liquid herbicide through a flow control valve at a controllable flow rate to a special applicator head provided on the lower end of the tubular handle.

Another object of the present invention is to provide a new and improved apparatus of the above described character wherein the elongated tubular handle serves as a herbicide supply reservoir having a fill port which is closable by means of a slidably demountable hand grip.

Another object of the present invention is to provide a new and improved apparatus of the above described character wherein the elongated tubular handle is provided with an in-line transparent sight tube portion which allows visual inspection of the herbicide supply.

Another object of the present invention is to provide a new and improved apparatus of the above described type wherein the applicator head extends angularly from the bottom of the tubular handle so as to lie in a substantially horizontal plane when the applicator apparatus is carried by a user as he walks about an area to be treated.

Another object of the present invention is to provide a new and improved hand-held liquid herbicide applicator of the above described character wherein the applicator head includes an elongated tubular dispenser conduit having incrementally spaced longitudinally aligned apertures formed along the bottom thereof for distributing the liquid herbicide to a special sponge assembly demountably carried on the dispenser conduit.

Another object of the present invention is to provide a new and improved apparatus of the above described character wherein the special sponge assembly includes a resilient sleeve for sliding coaxial mounting on the dispenser conduit and having incrementally spaced longitudinally aligned apertures formed therein to aligningly match those of the dispenser conduit, with a special synthetic sponge fixedly carried on the sleeve.

Still another object of the present invention is to provide a new and improved hand-held liquid herbicide applicator of the above described type wherein the special sponge is preferrably of semi-circular in cross section configuration and is affixed to the resilient sleeve so as to wrap around the apertured bottom thereof, with the sponge being formed, or otherwise provided with, a surface skin which is porous but comparatively dense to retard initial surface wetting of the sponge long enough to allow complete and even wetting of the interior of the sponge.

The foregoing and other objects of the present invention, as well as the invention itself, may be more fully understood from the following description when read in conjunction with the accompanying drawings.

DESCRIPTION OF THE PREFERRED EMBODIMENT

Figure 1:
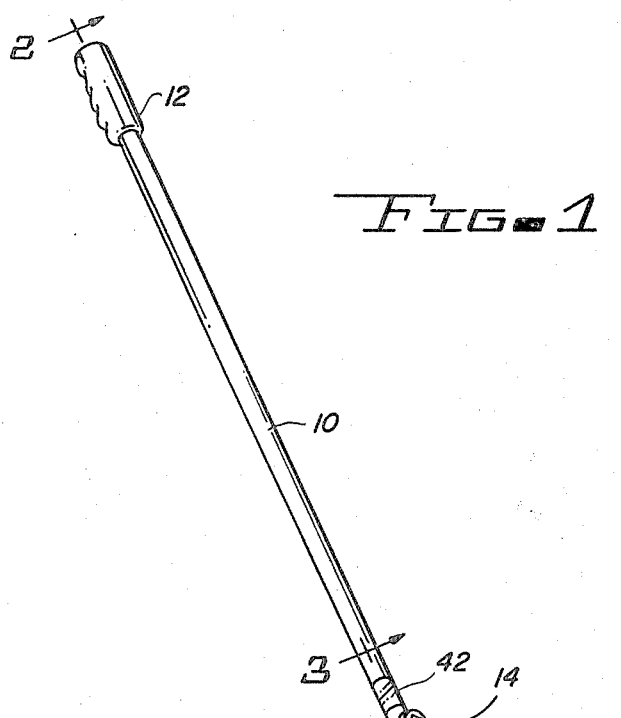
FIG. 1 is a perspective view illustrating the various features of the hand-held herbicide applicator of the present invention.

Referring more particularly to the drawings, FIG. 1 illustrates the hand-held liquid herbicide applicator of the present invention which, as will hereinafter be described in detail, is shown as including an elongated tubular handle 10 which serves as a container for a supply of liquid herbicide (not shown), with the upper end of the handle being provided with a demountable closure means 12. A flow control valve means 14 is mounted in the handle 10 for controlling the flow of the liquid herbicide to an especially configured applicator head 16 provided on the lower end of the handle.

Figure 2:
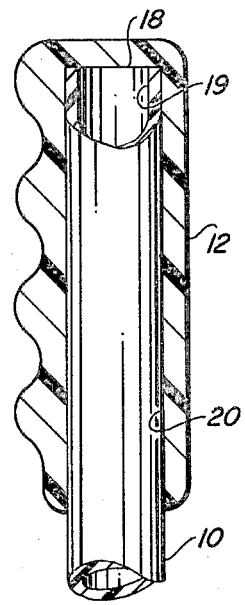
FIG. 2 is an enlarged fragmentary sectional view taken along the line 2—2 of FIG. 1.

As seen best in FIG. 2, the upper end of the tubular handle 10 is open as at 18 which provides a fill port by which the liquid herbicide is placed within the bore 19 of the handle. The demountable closure means 12 is in the preferred form of a hand grip which may be formed of a vinyl or other suitable material, and is of the type used extensively as a bicycle handle grip. The hand grip 12 is provided, as is well known in the art, with a blind bore 20, which is sized so that the hand grip is slidably demountably carried on the upper end of the tubular handle 10. Therefore, sliding removal of the hand grip 12 exposes the fill port 18 and when the hand grip is replaced, it serves to close the fill port 18 and thus prevent spillage when the apparatus is in use. It has been found that no special provisions for venting of the handle is necessary in that when the special sponge, which will hereinafter be described in detail, is wetted, its pores are opened enough to allow air to pass through the applicator head into the handle. This, along with the back and forth swinging motion of the applicator during use, will prevent a vacuum from forming in the handle.

It will be understood that the above described tubular handle 10 serving as the liquid herbicide supply reservoir is the preferred embodiment, but, that in instances where a larger supply reservoir would be desirable, a container (not shown) could be provided at the upper end of the handle, and due to such a larger capacity, the container (not shown) should be vented for proper flow.

The flow control valve means 14 as shown, is mounted on the lower end of the tubular handle 10 and may be of any of various well known devices, with the particular valve shown in the drawings being preferred.

The illustrated valve 14 is fully disclosed in U.S. patent application Ser. No. 190,090, filed Sept. 23, 1980, by Earl E. Chandler, for: FLOW REGULATING VALVE, and assigned to the inventor of the present application, which has now been abandoned. Since the illustrated, and preferred, valve is fully disclosed in the above referenced U.S. patent application, it will only be briefly described herein.

Figure 3:
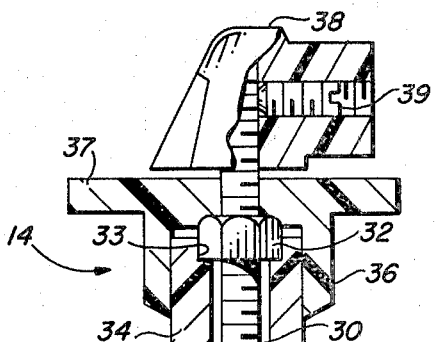
FIG. 3 is an enlarged fragmentary sectional view taken along the line 3—3 of FIG. 1.

The flow control valve means 14 includes a valve body 24 molded, or otherwise formed of a material which is compatable with the material of the tubular handle 10, such as Polyvinyl Chloride, so that a suitable adhesive may be employed to mount the valve body to the handle in the manner shown in FIG. 3. A relatively short piece of elastomeric tubing 26 is tightly positioned within the fluid passage 27 of the valve body, and a ball valve 28 is used to adjustably squeeze the tube 26 to control the flow of liquid herbicide therethrough. The ball valve 28 is held in bearing engagement with the sidewall of the elastomeric tube by a threaded stud 30 which is carried in a nut 32 that is captively held against rotation in the bore 33 of a transverse boss 34 integrally formed on the valve body 24. A suitable cap 36 is affixed on the extending end of the transverse boss 34 and is formed to engage the nut 32 to prevent axial displacement thereof. The cap 36 may be provided with an integral valve position indicator plate 37, and has a central bore through which the threaded stud 30 extends. A suitable knob 38 is attached to the extending end of the threaded stud, such as by a set screw 39, so that rotation of the knob will threadingly move the stud 30 to move the ball valve 28 relative to the sidewall of the elastomeric tube 26 and thereby apply more, or less squeezing force on the tube.

In the preferred embodiment, a transparent sight tube 42 is interposed between the lower end of the tubular handle 10 and the inlet to the valve means 14 so that a user is provided with a visual indication of when the supply of liquid herbicide is running low.

The applicator head 16 includes an elongated tubular dispenser conduit 50 one end 51 of which is connected to the outlet of the valve means 14 such as with a suitable adhesive. The dispenser conduit is bent as at 52 adjacent its end 51 so that the applicator head extends angularly with respect to the longitudinal axis of the tubular handle 10 for reasons which will hereinafter be described in detail. It will be noted that an alternative to the bent dispenser conduit 50 would be to employ a suitable angular elbow (not shown) to provide the necessary connection. In any event, the end 51 of the dispenser conduit 50 is connected by the valve means 14 so that the bore 53 of the dispenser conduit 50 may be placed, when the valve 14 is open, in communication with the bore 19 of the tubular handle 10 so as to receive the liquid herbicide from the handle. The extending, or free end of the tubular dispenser conduit 50 is closed such as with a suitable plug 54 which is sealingly affixed in the open end of the bore 53 thereof. A plurality of longitudinally aligned apertures 56 are provided in the dispenser conduit 50 so as to extend between the bend 52 and the end closing plug 54 in spaced icrements along the bottom surface of the conduit.

A special sponge assembly 60 is demountably carried on the tubular dispenser conduit 50 to absorb the liquid herbicide therefrom for wiping application on undesired vegetation.

The sponge assembly 60 includes a resilient sleeve 62 which may be formed of rubber or a suitable synthetic material such as vinyl. The sleeve 62 has a length dimension which substantially matches the distance between the bend 52 and the free end of the dispenser conduit 50 and has a bore 64 which is sized so that the sleeve is axially slidably movable on the periphery of the dispenser conduit, and yet is a relatively tight fit so as to prevent herbicide leakage from the opposite ends of the bore 64 of the sleeve. The sleeve 62 is provided with a plurality of apertures 66 formed along the length thereof in longitudinally aligned spaced increments. The number of the apertures 66 is equal to the number of the apertures 56 of the tubular dispenser conduit 50 and the incremental spacing is also equal so that when the sleeve 62 is concentrically mounted on the conduit 50, each aperture 66 is coaxial with respect to a different one of the apertures 56 of the conduit. The apertures 66 are of larger diameter than the apertures 56 which permits a limited amount of aperture misalignment to occur without affecting the herbicide flow.

Figure 5:
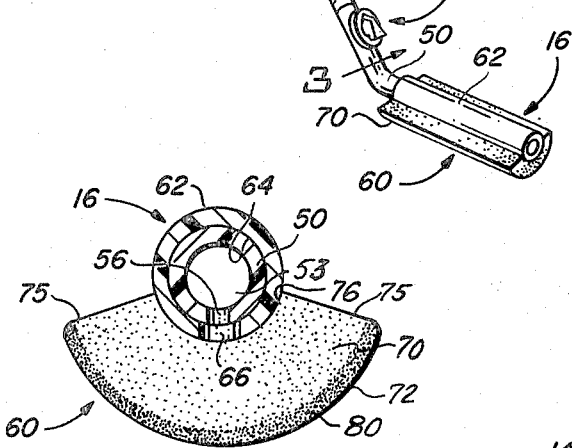
FIG. 5 is an enlarged sectional view taken along the line 5—5 of FIG. 4.

A special synthetic sponge 70 is mounted on the sleeve 62 to form the sponge assembly 60. The sponge 70 is of elongated configuration and is preferably of approximately semi-circular cross section, or somewhat less as seen best in FIG. 5. The sponge 70, which extends the full length of the sleeve 62 has an elongated arcuate peripheral surface 72, opposite end surfaces 73 and 74 and a top surface which is formed of two spaced segments 75 separated from each other by a channel 76 which is formed in the sponge so as to extend the full length thereof. The channel 76 is sized and configured so that the lower half of the sleeve 62 is nestingly received therein and a suitable adhesive is employed to fixedly attach the sponge to the sleeve.

As is known in the art, manufacturing of synthetic sponges is a molding process which provided the molded product with a somewhat unsightly outer skin which is of the same material as the sponge and is thus porous, but is of considerably denser character. In normal sponge fabrication processes, this unsightly outer skin is trimmed off for aesthetic reasons and to improve the liquid absorbing characteristics which would otherwise suffer due to the dense skin which, although processing liquid absorbing characteristics, will become saturated at a much slower rate in comparison to the internal sponge material.

The special sponge 70 used in the manufacturing of the hand-held liquid herbicide applicator of the present invention is molded in accordance with standard synthetic sponge fabrication techniques, but instead of being molded in elongated four-sided blocks as is the usual practice, it is molded in the unusual shape of an elongated solid cylindrical structure (not shown). Again, contrary to normal practices, the elongated solid cylindrical sponge structure is not trimmed and is thus completely enclosed by the above described relatively dense peripheral skin.

In preparing the solid cylindrical sponge structure for use in the manufacturing of the applicator of the present invention, a circular bore is drilled or otherwise formed axially therethrough and then the sponge is longitudinally cut in half, or preferably into three equal parts. Thus, when these operations are complete, one solid cylindrical sponge will form two or three of the sponges 62 each of which has the desired arcuate peripheral surface 72, and the channel or groove 76 which is arcuate in cross section.

At this point in the description, it will be assumed that the solid cylindrical sponge structure is molded with a length dimension which matches the length of the sleeve 62. In such a case, it will be seen that one of the longitudinally cut segments of the cylindrical sponge structure forms the especially configured sponge 70, and is ready for affixation to the sleeve 62 in the hereinbefore described manner. And, the special sponge 70 has the porous relatively dense skin as shown at 80 on its arcuate surface 72, and is shown at 82 on its end surfaces 73 and 74.

As hereinbefore mentioned, the applicator head 16 is disposed in a substantially horizontal plane when in use. Therefore, all surfaces of the special sponge 70 from which uncontrollable liquid flow, or dripping, could conceivably occur, are provided with the relatively dense skins 80 and 82. Thus, the liquid herbicide being supplied to the sponge 70, through the apertured sleeve 62 from the tubular dispenser conduit 50, will easily enter into the interior of the sponge proximate the arcuate in cross section channel 76 in that no skin is present in that area. The received liquid herbicide will be evenly absorbed and will saturate the entire internal sponge material before the outer skins 80 and 82 become saturated. Once complete saturation is completed, the liquid herbicide will flow evenly to all parts of the sponge due to its absorption properties and the peripheral surface will remain uniformly wetted.

Figure 4:
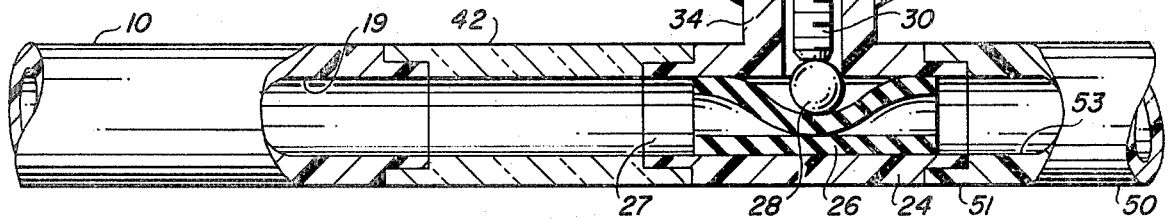
FIG. 4 is an enlarged side elevational view of the herbicide applicator head of the apparatus of the present invention which is partially broken away to include the various features of the demountable sponge assembly thereof.
Figure 4:
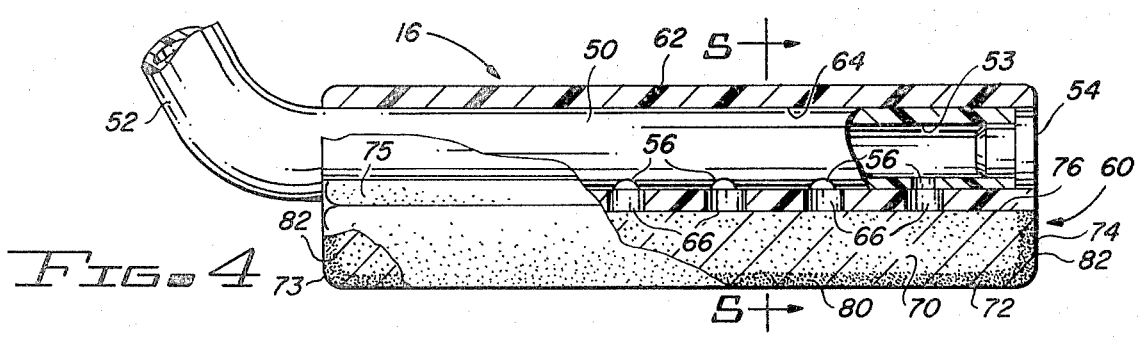

In cases where the hereinbefore mentioned solid cylindrical sponge structure (not shown) is molded with a length dimension which is greater than the length of the sleeve 62, it will be necessary to cut it to the desired length. Such cutting will remove the porous relatively dense skin 82 from one, or possibly both, of the end surfaces 73 and 74 of the special sponge 70, and uncontrollable liquid flow could occur at those end surfaces especially if the applicator head 16 were not held in the desired horizontal plane during initial sponge wetting. To insure against this occurring, it will be seen in FIG. 4 that the aperture 56 of the tubular dispenser conduit 50, and the aligned apertures 66 of the sleeve 62, are spaced inwardly from their respective opposite ends, i.e., no apertures are provided immediately adjacent the ends of the conduit or the sleeve. This will, in most cases, prevent liquid channelization, but to insure that such channelization, or other localized over saturation, in those areas does not result in uncontrollable liquid flow, the cut end surfaces of the sponge may be coated with a curable sealant (not shown) which retards, or completely prevents, surface wetting on those end surfaces. Many commercially available sealants may be used for this purpose, such as any silicone rubber.

To use the hand-held liquid herbicide applicator of the present invention, the user, after checking to make sure that an adequate supply of liquid herbicide is contained in the tubular handle 10, opens the flow control valve 14 to permit the liquid to flow into the tubular dispenser conduit 50 of the applicator head 16. The user must then wait a short time until the liquid herbicide saturates the special sponge 70. The sponge 70 will swell somewhat during the saturation process and the skins 80 and 82 will change color, i.e., become darker, when the saturation is complete. Then by holding the applicator in a normal position so that the handle 10 extends angularly downwardly and forwardly with the applicator head 16 lying in a substantially horizontal plane, the user may swing the applicator head back and forth in front of him as he walks around the area to be treated to wipingly bring the sponge 70 into contact with the vegetation that he desires to destroy. The flow control valve 14 may be adjusted to suit the particular situation. For example, if the area being treated contains relatively small and sparse weeds which have outgrown a lawn, liquid herbicide flow requirements will be less than is needed in an area of large and/or dense weed growth.

In addition to the hereinbefore described advantages provided by the dense skins 80 and 82 of the special sponge 70, the skins provide a particularly tough surface which is highly resistant to wear. However, wear and tear will occur as a result of unintentional ground contact, striking rocks, snagging on weed stocks and the like. When the special sponge 70 becomes worn to the extent that dripping of the liquid herbicide results, or could result, the entire demountable sponge assembly 60 can be replaced with a new one, and the worn assembly can be refurbished, if desired, by simply attaching a new sponge to the sleeve.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A hand-held liquid herbicide applicator for wipingly applying the liquid herbicide on undesired vegetation growing at ground level comprising:
   (a) an elongated, straight tubular handle for holding at a forwardly and downwardly extending angle which defines a normal application position, said tubular handle constituting a reservoir and having a bore which is open at the top for receiving the liquid herbicide;
   (b) a flow control valve means coupled to the lower end of the tubular handle so as to extend coaxially therefrom, said flow control valve means including valve adjustment means normal to the axis of the tubular handle for controlling the flow rate of the liquid herbicide from the bore of the tubular handle; and
   (c) an elongated applicator head including,
      I. an elongated tubular dispenser conduit one end of which is coupled to said flow control valve means co-axially with said tubular handle for receiving the liquid herbicide therefrom, said dispenser conduit having a bend so as to extend angularly with respect to the longitudinal axis of said tubular handle so as to lie in a substantially horizontal plane when said tubular handle is in its normal application position, said dispenser conduit having its other end closed and having a plurality of longitudinally aligned apertures formed in spaced increments along its bottom through which the liquid herbicide will exit said dispenser conduit,
      II. a sponge assembly carried on said dispenser conduit for absorbingly receiving the liquid herbicide from said dispenser conduit for wiping application on the undesired vegetation, said sponge assembly including, an elongated resilient sleeve demountably mounted on said dispenser conduit in frictional movement restraining contiguous engagement with the periphery of said dispenser conduit, said sleeve having a plurality of longitudinally aligned apertures formed in spaced increments therealong and in coaxial alignment with the apertures of said dispenser conduit, an elongated synthetic sponge affixed on at least a portion of the periphery of said sleeve for absorbingly receiving the liquid herbicide which is flowable through the aligned apertures of said dispenser conduit and said sleeve.

2. A hand-held liquid herbicide applicator as claimed in claim 1 wherein said sponge has a porous relatively dense peripheral skin for retarding surface wetting to insure complete and even internal saturation of said sponge.

3. A hand-held liquid herbicide applicator as claimed in claim 1 wherein said sleeve and said sponge are of substantially the same length.

4. A hand-held liquid herbicide applicator as claimed in claim 1 wherein said synthetic sponge has an elongated surface with an upwardly opening arcuate in cross section groove extending along that surface for nestingly receiving the bottom of said sleeve.

5. A hand-held liquid herbicide applicator as claimed in claim 1 wherein said synthetic sponge is of elongated arcuate in cross section configuration which defines an elongated arcuate peripheral surface, an opposed pair of end surfaces and an elongated surface having a longitudinally extending groove of arcuate cross section formed therein, said synthetic sponge having the bottom of said sleeve fixedly nestingly positioned in the groove provided in said synthetic sponge.

6. A hand-held liquid herbicide applicator as claimed in claim 5 wherein said synthetic sponge is formed with a porous relatively dense peripheral skin on the elongated arcuate surface thereof.

7. A hand-held liquid herbicide applicator as claimed in claim 5 wherein said synthetic sponge is formed with a porous relatively dense peripheral skin on the elongated arcuate surface and on at least one of the opposite end surfaces thereof.

8. A hand-held liquid herbicide applicator as claimed in claim 5 wherein said synthetic sponge is provided with a porous relatively dense skin on the elongated arcuate surface thereof and on both of the opposite end surfaces thereof.

9. A hand-held liquid herbicide applicator as claimed in claim 1 and further comprising a transparent sight tube interposed between said tubular handle and said flow control valve means.

10. A hand-held liquid herbicide applicator as claimed in claim 1 and further comprising a hand grip of resilient material slidably demountably carried on the open top of said tubular handle for closing thereof.

* * * * *